(12) United States Patent
Tabata et al.

(10) Patent No.: US 10,124,672 B2
(45) Date of Patent: Nov. 13, 2018

(54) PEDAL STRUCTURE OF AUTOMOTIVE VEHICLE

(71) Applicant: MAZDA MOTOR CORPORATION, Hiroshima (JP)

(72) Inventors: Koji Tabata, Kitakyushu (JP); Yoh Yamazaki, Hiroshima (JP); Masayuki Tokumo, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/429,613

(22) Filed: Feb. 10, 2017

(65) Prior Publication Data
US 2017/0240044 A1 Aug. 24, 2017

(30) Foreign Application Priority Data
Feb. 19, 2016 (JP) .................. 2016-029569

(51) Int. Cl.
*B60K 26/02* (2006.01)
*B60T 7/06* (2006.01)
*G05G 1/44* (2008.04)

(52) U.S. Cl.
CPC ............... *B60K 26/02* (2013.01); *B60T 7/06* (2013.01); *G05G 1/44* (2013.01)

(58) Field of Classification Search
CPC .............. B60K 26/02; B60T 7/06; G05G 1/44
See application file for complete search history.

(56) References Cited

U.S. PATENT DOCUMENTS

| 5,497,677 A | 3/1996 | Baumann et al. |
| 7,181,991 B2 * | 2/2007 | Naruse .................. B60K 26/02 74/512 |

FOREIGN PATENT DOCUMENTS

| JP | S58-045136 U | 3/1983 |
| JP | H07-251649 A | 10/1995 |
| JP | 2007-109162 A | 4/2007 |
| JP | 2015-229448 A | 12/2015 |

OTHER PUBLICATIONS

An Office Action; "Notification of Reasons for Refusal," mailed by the Japanese Patent Office dated Jan. 30, 2018, which corresponds to Japanese Patent Application No. 2016-029569 and is related to U.S. Appl. No. 15/429,613; with English Translation.

* cited by examiner

*Primary Examiner* — Thomas C Diaz
(74) *Attorney, Agent, or Firm* — Studebaker & Brackett PC (57) ABSTRACT

In a pedal structure of an automotive vehicle which includes a brake pedal and an accelerator pedal which are provided at a vehicle body side by side in a vehicle width direction, the accelerator pedal comprises an accelerator pedal body to receive a pressing operation by a right foot, a hinge portion pivotally supporting a lower end of the accelerator pedal body, and a pedal base supporting the accelerator pedal body via the hinge portion, and a heel support portion to support the right foot's heel is provided at the pedal base. The heel support portion is positioned on a left side of and adjacently to the hinge portion and spaced apart forward from the hinge portion by a specified distance.

4 Claims, 8 Drawing Sheets

PEDAL STRUCTURE OF AUTOMOTIVE VEHICLE

BACKGROUND OF THE INVENTION

The present invention relates to a pedal structure of an automotive vehicle, which includes an organ type accelerator pedal which is provided at a vehicle body and receives a forward pressing operation by a right foot of a passenger.

Conventionally, there are a hanging type and an organ type as the accelerator pedal which is provided adjacently to a brake pedal of the automotive vehicle. The hanging type accelerator pedal is configured such that a center of a forward rotation of the pedal is positioned above a pressing face where a sole of a passenger contacts, as shown in FIG. 1 of Japanese Utility-Model Laid-Open Publication No. S58-045136, for example. Accordingly, the hanging type accelerator pedal is configured such that when the passenger presses down the pedal with a support point of a heel which is placed on a floor surface of the automotive vehicle, a rotational locus of a right foot of the passenger and a rotational locus of the pedal are contrary to each other.

Meanwhile, the organ type accelerator pedal is configured, as shown in FIG. 3 of the above-described patent document such that the center of the forward rotation is positioned below the pressing face which the sole of the passenger contacts. Accordingly, in the organ type accelerator pedal, the rotational locus of the right foot of the passenger and the rotational locus of the pedal tend to substantially match each other when the pedal is pressed down.

Thus, it is said that the organ type accelerator pedal is more advantageous than the hanging type accelerator pedal in operability of the pedal and reduction of feeling of fatigue of the passenger.

In general, the pressing face of the organ type accelerator pedal is positioned in front of the pressing face of the brake pedal in a vehicle longitudinal direction. Therefore, when the passenger moves a tip of the foot to the pressing face of the organ type accelerator pedal from the pressing face of the brake pedal for an accelerator pedal's operation, keeping the position of the heel of the right foot which has been placed on the floor surface for the brake pedal's operation, the heel of the right foot is positioned in back of the pressing face of the organ type accelerator pedal in the vehicle longitudinal direction.

In this case, for example, the rotational center of the organ type accelerator pedal having a roughly flat-plate shaped pedal and the heel of the right foot are spaced apart from each other, so that the rotational locus of the right foot and the rotational locus of the pedal does not easily match each other.

Further, the above-described unmatched locus between the foot's rotational locus and the pedal's rotational locus causes a slip of the sole, so that the heel is shifted forward or away from the floor surface. Herein, the driver reflexively makes an ankle joint have plantar flexion or dorsiflexion in order to stabilize the pressing operation of the foot.

In the case where the heel of the right foot is placed on a portion of the floor surface which is positioned in back of the pressing face of the organ type accelerator pedal having the roughly flat-plate shaped pedal as described above, the driver tends to move the ankle joint often because of the above-described unmatched locus, so that there is a problem that the driver may have feeling of fatigue with the right foot too much.

SUMMARY OF THE INVENTION

The present invention has been devised in view of the above-described problem, and an object of the present invention is to provide a pedal structure of an automotive vehicle which can reduce the driver's feeling of fatigue, without damaging the operability of the organ type accelerator pedal.

The present invention is a pedal structure of an automotive vehicle, which includes a brake pedal and an organ type accelerator pedal which are provided at a vehicle body side by side in a vehicle width direction and receive a forward pressing operation by a right foot of a passenger, respectively, the organ type accelerator pedal comprising a pedal body to receive the forward pressing operation by the right foot of the passenger, a pivot portion pivotally supporting a lower end of the pedal body, and a pedal base fixed to the vehicle body and supporting the pedal body via the pivotal portion, wherein the pedal body of the organ type accelerator pedal comprises a pressing face portion which includes a pressing face which a sole of the passenger contacts and an extension portion which is configured to extend from a lower end of the pressing face portion rightward and also obliquely rearward and downward and includes a face crossing the pressing face of the pressing face portion, which are integrally formed, and the pedal base of the organ type accelerator pedal comprises a heel support portion which a heel of the right foot of the passenger contacts and supports the heel of the right foot, the heel support portion being positioned on a left side of and adjacently to the pivotal portion and being spaced apart forward from the pivotal portion by a specified distance.

The above-described specified distance is to be set so that the quantity of the unmatched locus between the rotational locus of the pressing face of the organ type accelerator pedal and the rotational locus of the right foot can be within an allowable range, and that may be set at 3 mm or smaller, preferably.

According to the present invention, the driver's feeling of fatigue can be reduced, without damaging the operability of the organ type accelerator pedal. Specifically, since the pedal body comprises the pressing face portion including the pressing face which the passenger's sole contacts and the extension portion including the face crossing the pressing face of the pressing face portion, the organ type accelerator pedal can be configured such that the pivotal portion is positioned, in a side view, in back of an imaginary straight line which extends downward along the pressing face of the pressing face portion.

Accordingly, even in a case where the heel is placed at a position located in back of the imaginary straight line extending downward along the pressing face of the pressing face portion, the present pedal structure of the automotive vehicle can make the right foot's heel and the pivotal portion be closer to each other, compared to the roughly flat-plate shaped pedal body.

Further, since the pedal base includes the heel support portion in the present pedal structure of the automotive vehicle, the driver can easily recognize (determine) the position of the heel of the right foot relative to the pressing face portion when placing the right foot on the pressing face portion of the organ type accelerator pedal. Additionally, the present pedal structure of the automotive vehicle can limit a forward move of the right foot's heel by means of the heel support portion.

Thereby, the present pedal structure of the automotive vehicle can suppress the unmatched locus between the rotational locus of the pressing face of the organ type accelerator pedal and the rotational locus of the right foot when the pedal is pressed down. Accordingly, the present pedal structure of the automotive vehicle can prevent the moving of the right foot's heel which is caused by the unmatched locus.

Even in a situation where the right foot is shifted forward when the organ type accelerator pedal is pressed down, the present pedal structure of the automotive vehicle can receive the heel of the right foot, thereby suppressing the unmatched locus between the rotational locus of the pressing face of the organ type accelerator pedal and the rotational locus of the right foot.

That is, the present pedal structure of the automotive vehicle can make the driver visually and sensuously recognize (determine) the appropriate position for the operation of the organ type accelerator pedal by means of the heel support portion. Accordingly, the present pedal structure of the automotive vehicle can restrain the driver from reflexively making the ankle joint have the plantar flexion or the dorsiflexion. Herein, since the driver's reflexively making the ankle joint have the plantar flexion or the dorsiflexion is performed by fast muscles, the present pedal structure of the automotive vehicle can suppress moves of the fast muscles which tend to get tired easily.

Additionally, since the position of the right foot's heel relative to the pressing face portion is stabilized, the driver can operate the organ type accelerator pedal with a properly-light pressing force. Thus, the present pedal structure of the automotive vehicle can reduce the driver's feeling of fatigue, without damaging the operability of the organ type accelerator pedal.

In an embodiment of the present invention, the extension portion of the pedal body of the organ type accelerator pedal includes a slant portion at an upper portion thereof, the slant portion being configured to slant toward the heel support portion of the pedal base.

According to this embodiment, the present pedal structure of the automotive vehicle can stably secure the operability of the organ type accelerator pedal and also securely reduce the driver's feeling of fatigue.

Specifically, when the driver presses down the organ type accelerator pedal in the state where the heel contacts the heel support portion, the present pedal structure of the automotive vehicle can prevent the driver's right foot and the extension portion of the pedal body from contacting each other by means of the slant portion configured to slant toward the heel support portion. Accordingly, the present pedal structure of the automotive vehicle can prevent that the pressing operation of the driver is improperly blocked by a contact of the right foot with the extension portion.

Further, since the slant portion slants toward the heel support portion, the present pedal structure of the automotive vehicle can have the slant portion serve as a guide means for guiding the right foot's heel which is away from the floor surface toward the heel support portion of the organ type accelerator pedal. For example, in a case where the driver returns the right foot after conducting a so-called heel and toe operation, the present pedal structure of the automotive vehicle can stably move the right foot's heel which is away from the floor surface to the heel support portion along the slant portion.

Thus, since the right foot's heel can be stably supported at the heel support portion, the present pedal structure of the automotive vehicle can further suppress the unmatched locus between the rotational locus of the pressing face of the organ type accelerator pedal and the rotational locus of the right foot. Thus, the present pedal structure of the automotive vehicle can stably secure the operability of the organ type accelerator pedal and also securely reduce the driver's feeling of fatigue.

In another embodiment of the present invention, the heel support portion of the organ type accelerator pedal is formed at a position which is located closely to a right end, in the vehicle width direction, of the brake pedal, and the pedal body of the organ type accelerator pedal is configured such that the right foot of the passenger which is inclined rightward by about 10 degrees around the heel of the right foot and the pressing face of the pressing face portion thereof contact each other.

According to this embodiment, the present pedal structure of the automotive vehicle can improve the operability of a pressing operation change between the brake pedal pressing and the organ type accelerator pedal pressing, and also reduce the driver's feeling of fatigue securely.

Specifically, since a right end of the brake pedal and the heel support portion of the organ type accelerator pedal are close to each other in the vehicle width direction, the driver can easily operate the brake pedal and the organ type accelerator pedal alternatively in a state where the heel contacts the heel support portion. Thereby, the present pedal structure of the automotive vehicle can achieve a driver's quick pressing change between the brake pedal and the organ type accelerator pedal with the support point at the right foot's heel.

Further, even in a case where the right foot is shifted forward when the driver presses down the brake pedal, for example, the present pedal structure of the automotive vehicle can receive the right foot's heel at the heel support portion. Accordingly, the present pedal structure of the automotive vehicle can stabilize the position of the right foot for the brake pedal as well as the organ type accelerator pedal.

Additionally, when the driver operates the brake pedal and the organ type accelerator pedal alternatively with a support point at the right foot's heel, there often happens a situation where the driver places the right foot on the pressing face of the organ type accelerator pedal in a state where the right foot is inclined rightward by about 10 degrees around the heel.

Herein, by configuring the pedal body of the organ type accelerator pedal such that the right foot of the passenger inclined rightward by about 10 degrees around the heel of the right foot and the pressing face of the pressing face portion contact each other, the driver can securely operate the organ type accelerator pedal in a comfortable position.

Herein, since the extension portion is provided to extend rightward relative to the pressing face portion, the present pedal structure of the automotive vehicle can prevent that the extension portion of the organ type accelerator pedal and the right foot of the passenger contact each other.

Thereby, the present pedal structure of the automotive vehicle can compatibly attain the secure operability of the organ type accelerator pedal and the reduction of the driver's feeling of fatigue. Accordingly, the present pedal structure of the automotive vehicle can improve the operability of the brake pedal and the organ type accelerator pedal and reduce the driver's feeling of fatigue more securely.

In another embodiment of the present invention, a right end of a pressing face portion of the brake pedal and the heel support portion of the organ type accelerator pedal are provided to be close to each other in the vehicle width direction.

According to this embodiment, the present pedal structure of the automotive vehicle can achieve a driver's quick pressing change between the brake pedal and the accelerator pedal with a support point at a right foot's heel.

Other features, aspects, and advantages of the present invention will become apparent from the following description which refers to the accompanying drawings.

DETAILED DESCRIPTION OF THE INVENTION

Figure 1:
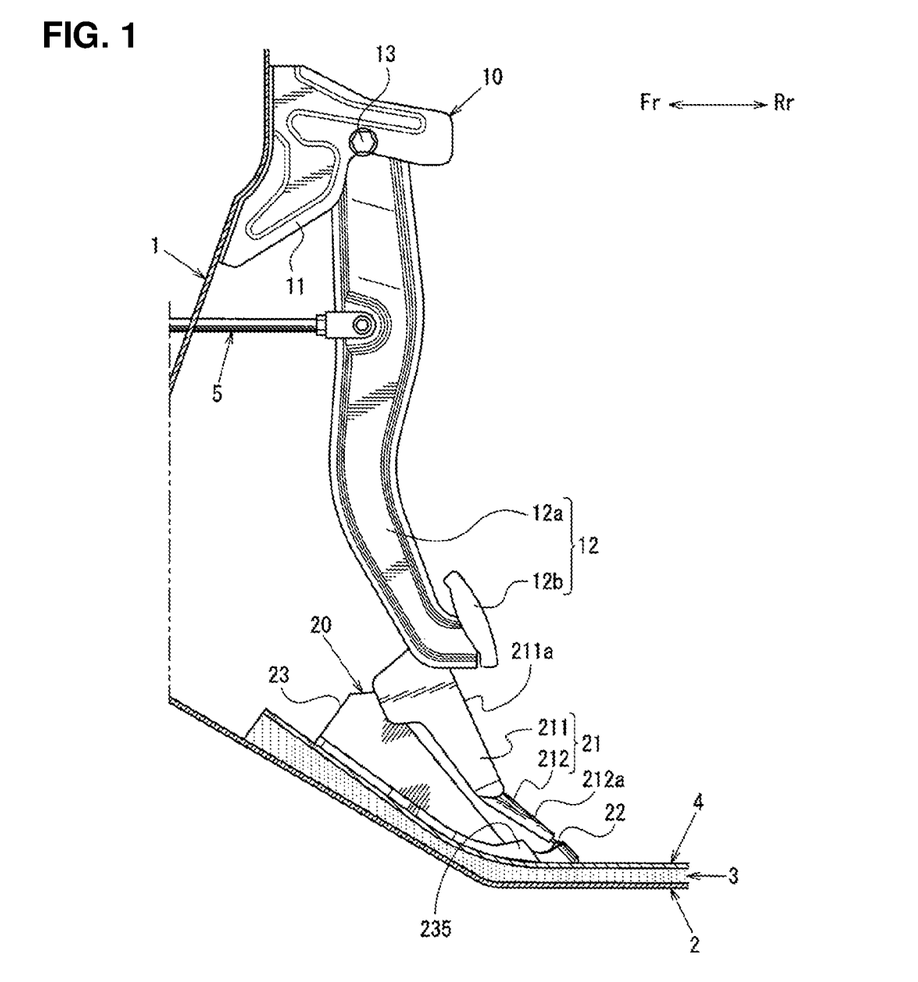
FIG. 1 is a side view showing a pedal structure of an automotive vehicle, when viewed from a leftward side of the vehicle.

Hereafter, an embodiment of the present invention will be described referring to the accompanying drawings. FIG. 1 shows a side view of a pedal structure of an automotive vehicle, when viewed from a leftward side of the vehicle, FIG. 2 shows an elevational view showing the pedal structure of the automotive vehicle, when viewed from a rearward side of the vehicle, and FIG. 3 is an explanatory diagram explaining a rotational locus of an accelerator pedal 20 and a rotational locus of a right foot Z1.

Figure 4:
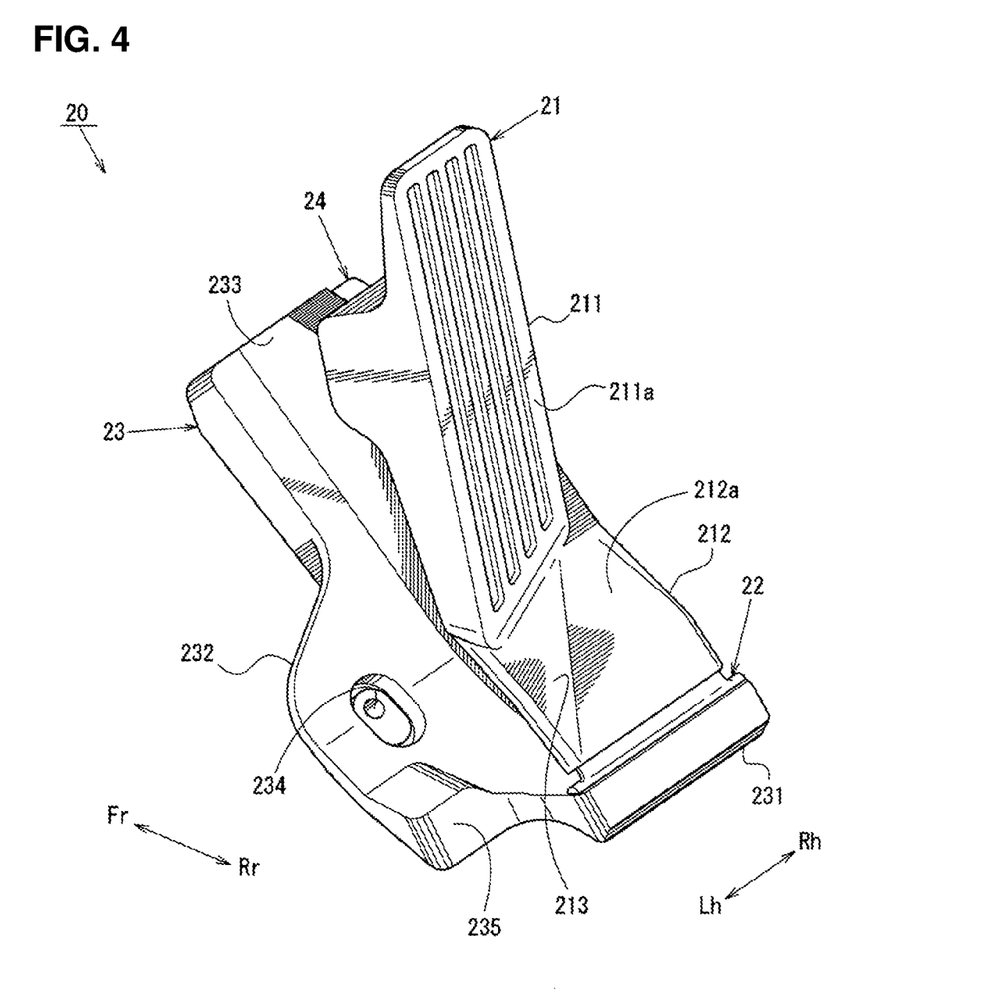
FIG. 4 is a perspective view showing appearance of the accelerator pedal, when viewed from an upward-and-leftward side of the vehicle.
Figure 5:
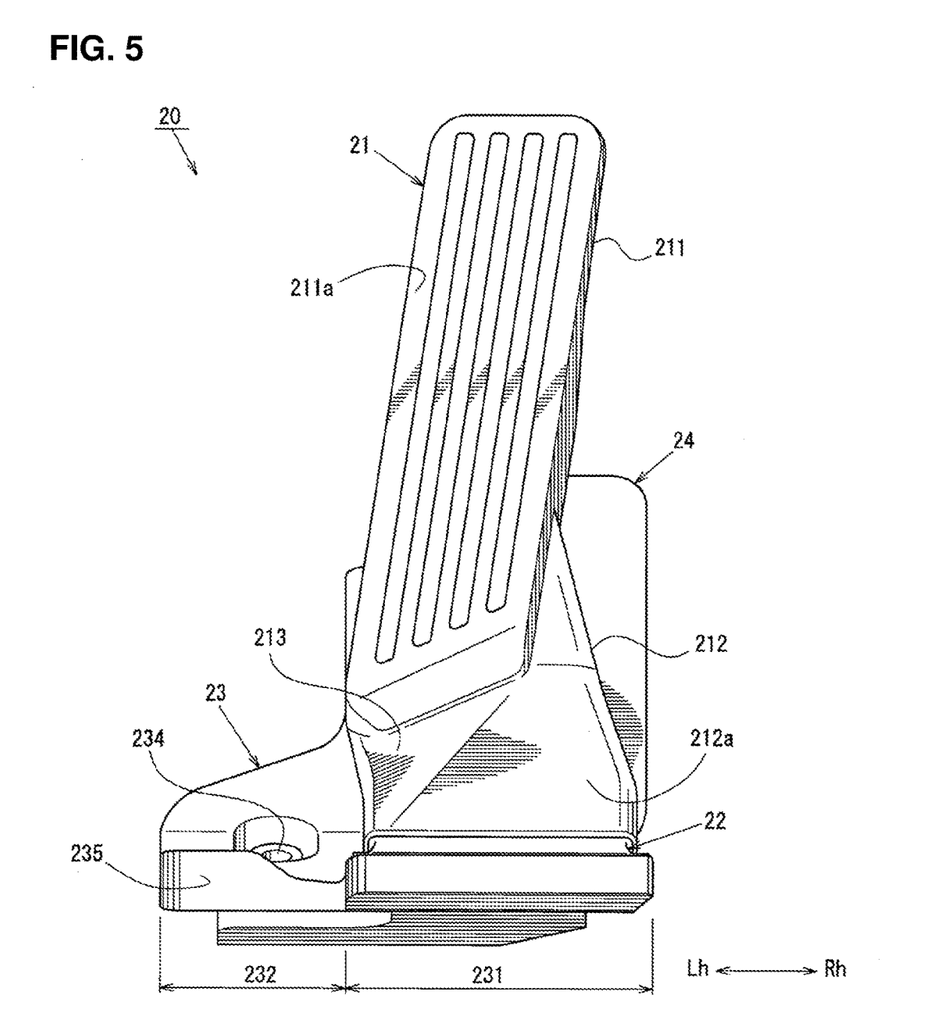
FIG. 5 is an elevational view showing the appearance of the accelerator pedal, when viewed from the rearward side of the vehicle.
Figure 6:
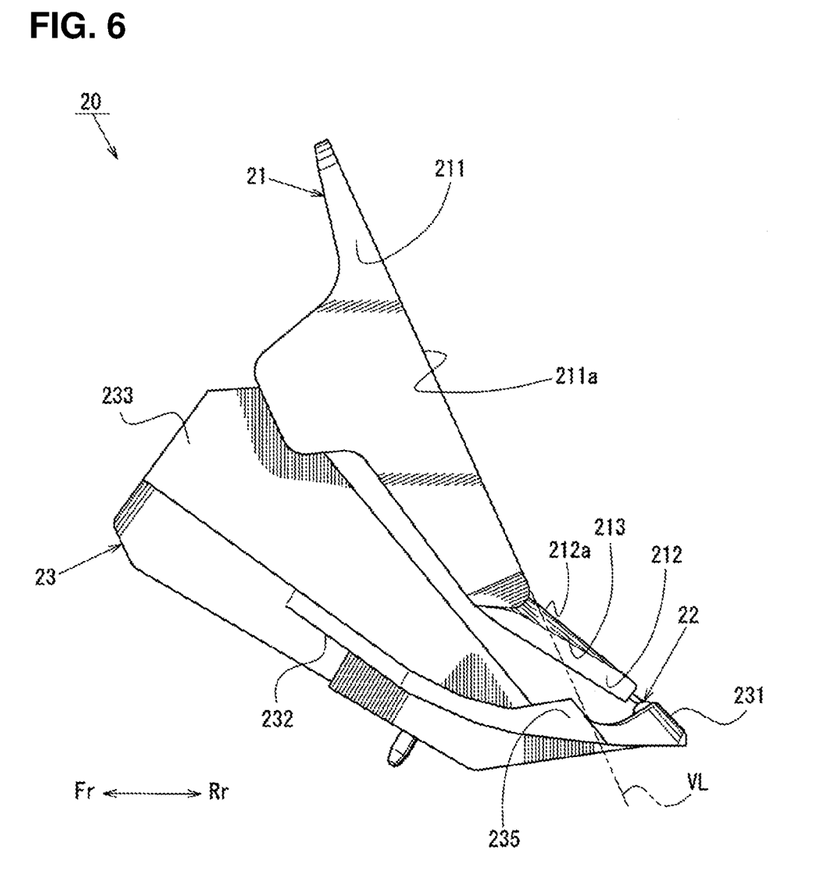
FIG. 6 is a side view showing the appearance of the accelerator pedal, when viewed from the side of the vehicle.
Figure 7:
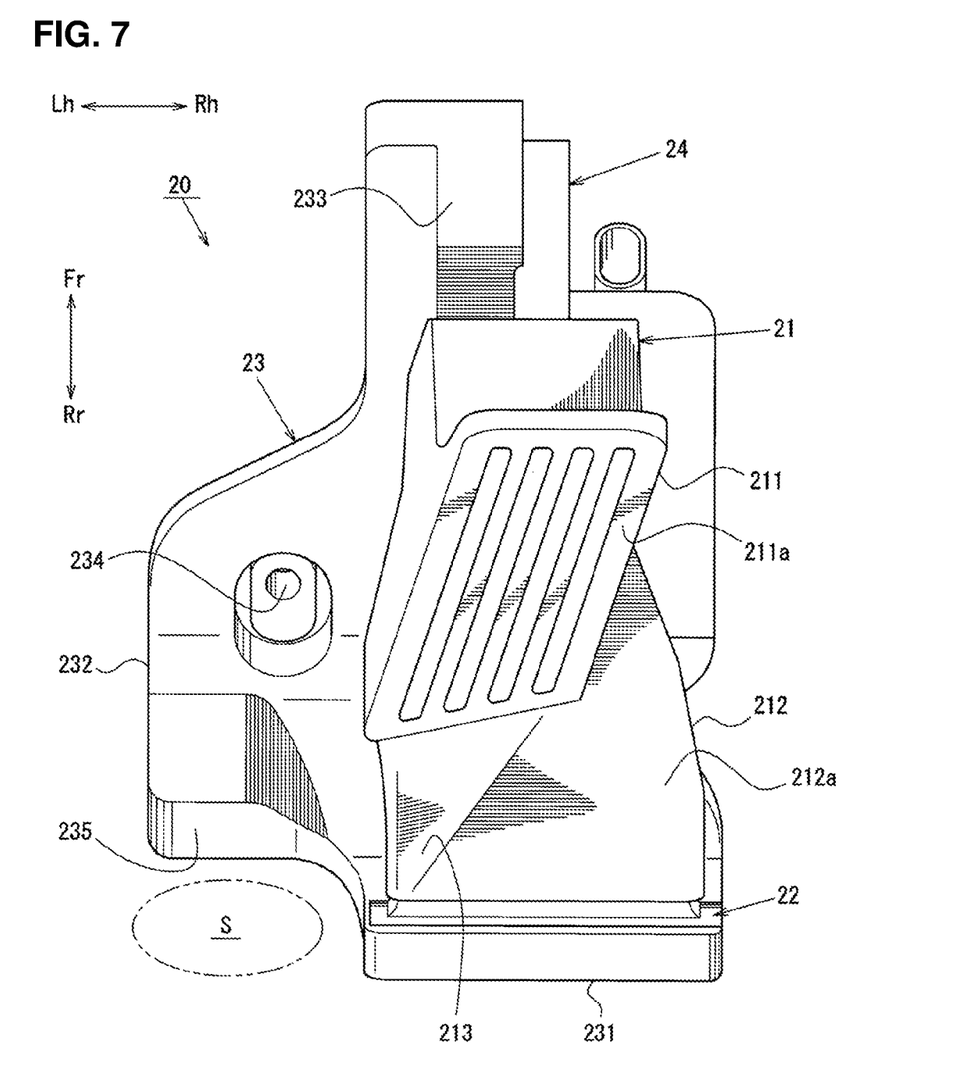
FIG. 7 is a plan view showing the appearance of the accelerator pedal, when viewed from an upward side of the vehicle.

Further, FIG. 4 shows a perspective view of appearance of the accelerator pedal 20, when viewed from an upward-and-leftward side of the vehicle, FIG. 5 shows an elevational view of the accelerator pedal 20, when viewed from the rearward side of the vehicle, FIG. 6 shows a side view of the accelerator pedal 20, when viewed from the side of the vehicle, and FIG. 7 shows a plan view of the accelerator pedal 20, when viewed from an upward side of the vehicle.

In the figures, arrows Fr, Rr show a vehicle longitudinal direction, the arrow Fr showing a vehicle forward direction and the arrow Rr showing a vehicle rearward direction. Further, arrows Rh, Lh show a vehicle width direction, the arrow Rh showing a vehicle rightward direction and the arrow Lh showing a vehicle leftward direction. Additionally, an upward side of FIG. 1 shows a vehicle upward side and a downward side of FIG. 1 shows a vehicle downward side.

Figure 2:
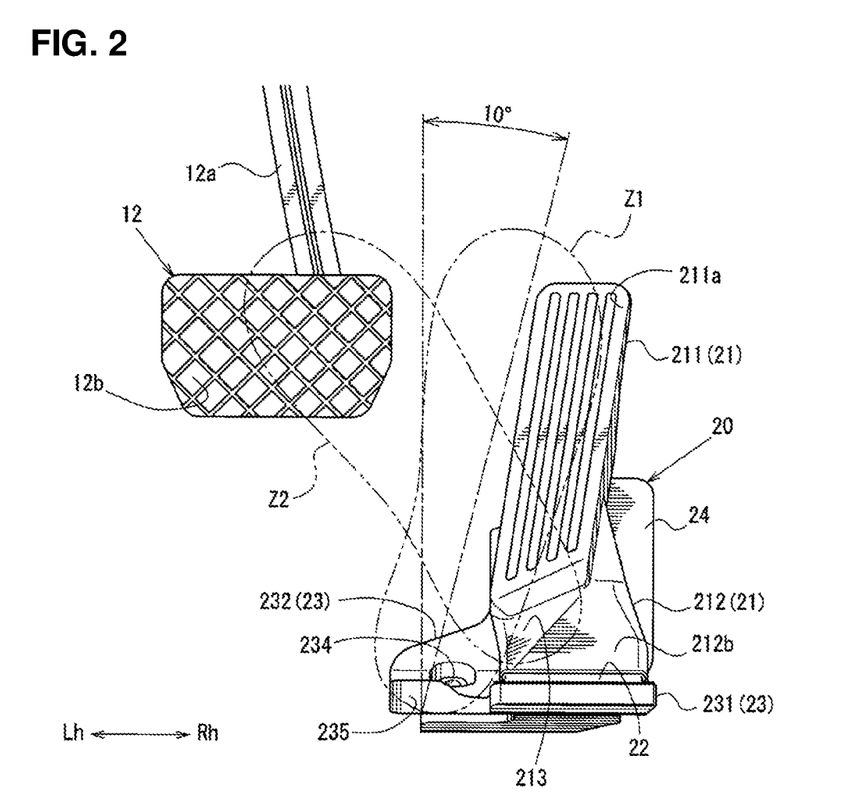
FIG. 2 is an elevational view showing the pedal structure of the automotive vehicle, when viewed from a rearward side of the vehicle.
Figure 3:
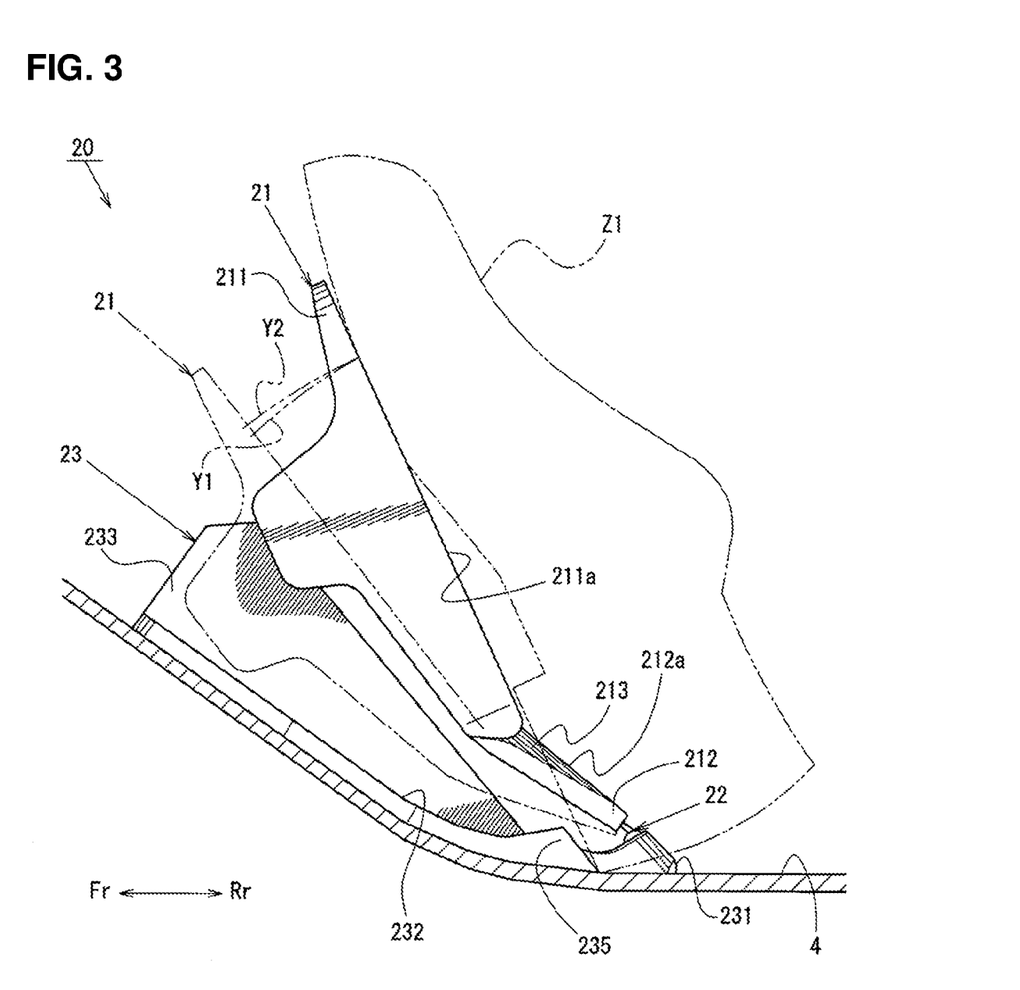
FIG. 3 is an explanatory diagram explaining a rotational locus of an accelerator pedal and a rotational locus of a right foot.

In the pedal structure of the automotive vehicle of the present embodiment, as shown in FIGS. 1 and 2, a brake pedal 10 which is fixedly fastened to a dash panel 1 which partitions a cabin from an engine room (not illustrated) provided at a front portion of the vehicle and an accelerator pedal 20 which fixedly fastened to a floor panel 2 which forms a floor surface of the cabin are provided, side by side, in order from the leftward side of the vehicle. Herein, a noise-insulating member 3 which insulates noises transmitted to the cabin from a vehicle outside and a floor carpet 4 are provided on an upper face of the floor panel 2 in order as shown in FIG. 1.

The brake pedal 10 is a hanging type pedal which is fixedly fastened to the dash panel 1 as shown in FIGS. 1 and 2, and has a function of transmitting a forward pressing operation by a right foot of a passenger to a brake booster (not illustrated) via a push rod 5.

The brake pedal 10 comprises a pedal bracket 11 which is fixedly fastened to the dash panel 1 and a brake pedal body 12 which is pivotally supported at the pedal bracket 11. The pedal bracket 11 is made by bending a meal plate three-dimensionally. Further, the pedal bracket 11 has an opening hole (not illustrated), into which a bolt 13 is inserted. This bolt 13 pivotally supports an upper portion of the brake pedal body 12.

The brake pedal body 12 comprises a pedal arm 12a which is pivotally supported at the pedal bracket 11 and extends in a vehicle vertical direction and a brake-pedal pressing face portion 12b which is provided at a lower end of the pedal arm 12a and which a sole of the right foot of the passenger contacts.

The pedal arm 12a is made by overlapping thin plate members which respectively have a hat-shaped cross section in the vehicle width direction such that the pedal arm 12a has a closed cross section. A push rod 5 of the brake booster is pivotally connected to an upper portion of the pedal arm 12a which is positioned above a central portion, in the vehicle vertical direction, of the pedal arm 12a. The brake-pedal pressing face portion 12b is made of a metal flat-plate which is joined to a lower end of the pedal arm 12a and a rubber member which is attached to the metal flat-plate.

Meanwhile, the accelerator pedal 20 is, as shown in FIGS. 1 and 2, an organ type pedal which is fixedly fastened to the floor panel 2, and has a function of outputting a signal regarding an accelerator opening by way of a signal line which is electrically connected to an ECU to control an engine.

The accelerator pedal 20 comprises, as shown in FIGS. 2 through 4, an accelerator pedal body 21 which the right foot Z1 of the passenger contacts, a hinge portion 22 which is connected to a lower end of the accelerator pedal body 21, a pedal base 23 which is fixedly fastened to the floor panel 2 and pivotally supports the accelerator pedal body 21 via a hinge portion 22, an accelerator-opening detecting sensor 24 which detects a rotational (swing) angle of the accelerator pedal body 21 as an accelerator opening, and others.

As shown in FIG. 3, the accelerator pedal body 21 is formed in a bent shape such that it comprises a first pressing face 211a which a tip of the right foot Z1 contacts and a second pressing face 212a which crosses the first pressing face 211a, which are connected via a bent connection portion in the side view. Further, as shown in FIGS. 1 and 2, the hinge portion 22 pivotally supports the accelerator pedal body 21 at a position which is located on the right side and in back of the brake-pedal pressing face portion 12b in the side view.

Further, as shown in FIGS. 3 and 4, the pedal base 23 pivotally supports the accelerator pedal body 21 via the hinge portion 22 at its rightward portion. At a leftward side of the pedal base 23 is provided a heel support portion 235 which supports the heel of the right foot Z1. Specifically, the heel support portion 235 is spaced apart forward from the hinge portion 22 by a specified distance.

The hinge portion 22 and the heel support portion 235 of the accelerator pedal 20 are positioned, as shown in FIG. 3, so that a difference (unmatched locus), in the side view, between a rotational locus Y1 of the accelerator pedal body 21 which rotates obliquely forward and downward with its rotational axis of the hinge portion 22 and a rotational locus Y2 of the right foot Z1 which rotates obliquely forward and downward with its rotational axis of the heel contacting the heel support portion 235 can be 3 mm or smaller in a state where the accelerator opening is 100%, which is illustrated by a two-dotted broken line.

More specifically, the accelerator pedal body 21 comprises, as shown in FIGS. 3 and 4, a first pedal pressing face portion 211 which the tip of the right foot Z1 contacts in a state where the heel contacts the floor surface and a second pedal pressing face portion 212 which a heel of a right foot Z2 contacts during the heel-and-toe operation, for example, which are formed integrally.

As shown in FIG. 1, the first pedal pressing face portion 211 is positioned in front of the brake-pedal pressing face portion 12b in the side view. Further, the first pedal pressing face portion 211 is configured, as shown in FIG. 2, such that the right foot Z1 which is inclined rightward by about 10 degrees around the heel of the right foot Z1 which contacts the heel support portion 235 of the pedal base 23 and the first pressing face 211a contact each other.

Specifically, the first pedal pressing face portion 211 is, as shown in FIGS. 5 and 6, formed in a parallelogram shape, when viewed from the rearward side of the vehicle, such that its upper side is offset rightward and its vertical length is longer. Herein, the first pressing face 211a of the first pressing face portion 211 is configured to have a flat face which slants such that its lower end is positioned rearward relative to its upper end in the side view.

The second pedal pressing face portion 212 is configured, as shown in FIG. 1, such that the second pressing face 212a is positioned in back of the brake-pedal pressing face portion 12b in the vehicle longitudinal direction. The second pedal pressing face portion 212 is configured to extend from a lower portion of the first pedal pressing face portion 211 rightward and also obliquely rearward and downward so that the right foot Z1 placed on the first pedal pressing face portion 211 does not contact the second pedal pressing face portion 212 as shown in FIGS. 2, 3 and 7.

Herein, the second pressing face 212a of the second pedal pressing face portion 212 is configured, as shown in FIGS. 5 and 6, such that its lower end is positioned in back of its upper end and it has a flat face which slants having a slant angle which is different from that of the first pressing face 211a.

Additionally, as shown in FIGS. 4 through 6, the second pedal pressing face portion 212 includes a slant portion 213 which has a slant face slanting toward the heel support portion 235 of the pedal base 23.

This slant portion 213 is configured such that a portion thereof which is positioned on the leftward side of an imaginary diagonal line (not illustrated) which connects a right end of a lower end of the first pedal pressing face portion 211 and a left end of a lower end of the second pedal pressing face portion 212 slants downward.

The hinge portion 22 has a rotational axis extending in the vehicle width direction and pivotally support the accelerator pedal body 21 at the pedal base 23 as shown in FIGS. 3 and 4. The pedal base 23 is configured, as shown in FIG. 1, such that it extends forward along the floor panel 2 from its rear end to which the hinge portion 22 is connected and then rises obliquely forward and upward.

Specifically, the pedal base 23 comprises, as shown FIGS. 4 through 6, a base right portion 231 to which the accelerator pedal body 21 is connected and a base left portion 232 which includes the heel support portion 235, which are arranged in this order from the rightward side of the vehicle and formed integrally.

The base right portion 231 is, as shown in FIG. 1, configured to support the accelerator pedal body 21 via the hinge portion 22 at a position which is spaced apart rearward from the first pressing face 211a of the accelerator pedal body 21 by a specified distance.

Specifically, the base right portion 231 is configured to have the hinge portion 22 be connected thereto at the position spaced apart rearward from the first pressing face 211a by the specified distance so that the difference between the rotational locus Y1 of the accelerator pedal body 21 and the rotational locus Y2 of the right foot Z1 can be 3 mm or smaller in the state where the accelerator opening is 100%. Further, the base right portion 231 is configured such that a housing portion 233 which accommodates the accelerator-opening detecting sensor 24 and others protrudes rearward.

As shown in FIG. 2, the base left portion 232 extends leftward, in the vehicle width direction, from a lower portion of the base right portion 231 such that a left end of the base left portion 232 is located substantially at the same position as a right end of the brake-pedal pressing face portion 12b. This base left portion 232 has a bolt hole 234 to be screwed to the floor panel 2, into which a bolt (not illustrated) is inserted.

Further, as shown in FIGS. 3 and 4, the heel support portion 235 which supports the heel of the right foot Z1 placed on the floor surface from the vehicle forward side is formed at a rear end of the base left portion 232. The heel support portion 235 is, as shown in FIGS. 5 through 7, located at the position which is spaced apart forward from the hinge portion 22 so that the difference, in the side view, between the rotational locus Y1 of the accelerator pedal body 21 and the rotational locus Y2 of the right foot Z1 can be 3 mm or smaller in the state where the accelerator opening is 100%.

More specifically, the heel support portion 235 is configured, as shown in FIG. 6, such that an imaginary straight line VL which extends downward along the first pressing face 211a of the accelerator pedal body 21 and an end face of the heel support portion 235 cross each other. The end face of the heel support portion 235 is a slant face which slants forward more than the imaginary straight line VL extending downward along the first pressing face 211a of the accelerator pedal body 21 in the side view.

Further, the pedal base 23 has a heel-arrangement space S where the right foot's heel can be arranged, which is formed by the base left portion 232 on the leftward side of the hinge portion 22 as shown in FIG. 7. Herein, a rear end of the base left portion 232 is positioned in back of a rear end of the base right portion 231.

Hereafter, the effects of the above-described pedal structure of the automotive vehicle will be described referring to moves of a gastrocnemius muscle and a soleus muscle which are part of a lower thigh of the passenger. Specifically, an accelerator pedal which does not comprise the heel support portion is provided as a comparative sample, and the moves of the gastrocnemius muscle and the soleus muscle when the accelerator pedal 20 of the present invention and the accelerator pedal of the comparative example are pressed down will be described referring to FIGS. 8A and 8B.

Figure 8A:
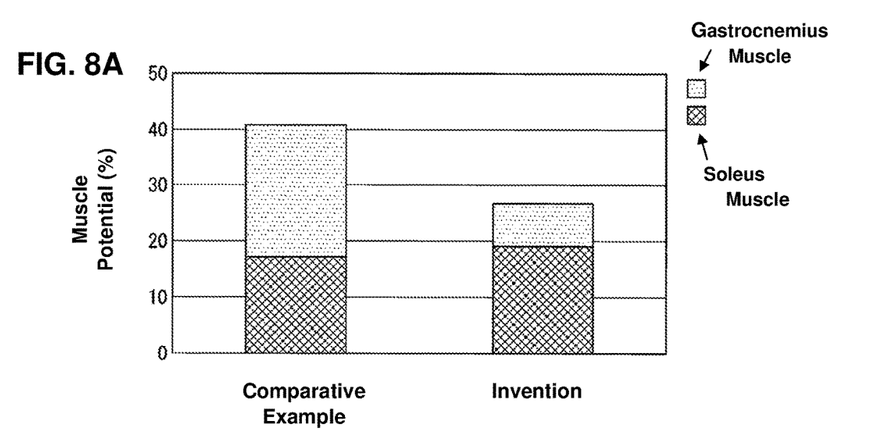
FIGS. 8A and 8B are explanatory diagrams explaining moves of muscles when the accelerator pedal of the present invention is pressed down.
Figure 8B:
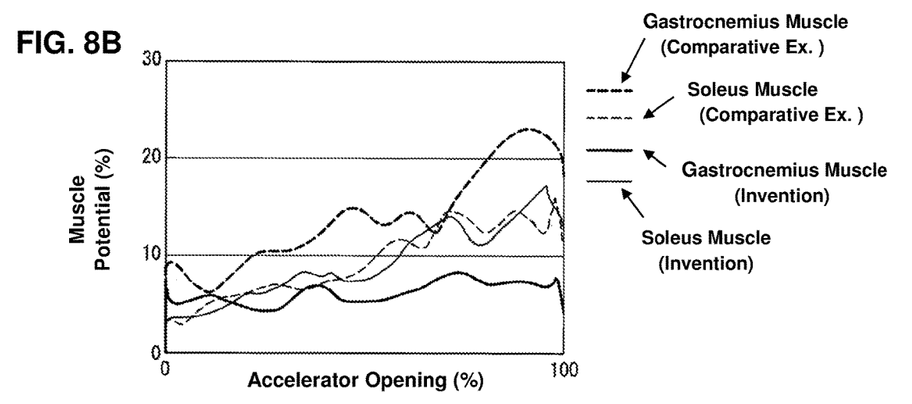

FIGS. 8A and 8B show explanatory diagrams which explain the moves of the muscles when the accelerator pedal 20 of the present invention is pressed down, FIG. 8A showing a relational diagram of a use manner of the gastrocnemius muscle and the soleus muscle when the passenger presses down the accelerator pedal, and FIG. 8B showing a graph of muscle potentials of the gastrocnemius muscle and the soleus muscle for the accelerator opening.

First, relationships of the use manner of the gastrocnemius muscle and the soleus muscle when the passenger presses down the accelerator pedal will be described referring to FIG. 8A. FIG. 8A shows the total of the muscle potentials of the gastrocnemius muscle and the soleus muscle when the accelerator pedal 20 of the present invention or the accelerator pedal of the comparative example are pressed down, wherein it is to be considered that the larger the muscle potential is, the more the muscle is active.

As shown in FIG. 8A, the muscle potential of the gastrocnemius muscle and the soleus muscle when the accelerator pedal of the comparative example is pressed down is about 41% MVC, whereas the muscle potential of the gastrocnemius muscle and the soleus muscle when the accelerator pedal 20 of the present invention is pressed down is about 27% MVC.

Further, according to FIG. 8A, the muscle potential of the soleus muscle when the accelerator pedal of the comparative example is pressed down is about 17% MVC, whereas the muscle potential of the soleus muscle when the accelerator pedal 20 of the present invention is pressed down is about 19% MVC, which shows that there is not a big difference in the move of the soleus muscle between the present invention and the comparative example.

However, the muscle potential of the gastrocnemius muscle when the accelerator pedal of the comparative example is pressed down is about 24% MVC, whereas the muscle potential of the gastrocnemius muscle when the accelerator pedal 20 of the present invention is pressed down is about 8% MVC, which shows that there is a big difference between them.

Subsequently, relationships of the muscle potentials of the gastrocnemius muscle and the soleus muscle for the accelerator opening will be described referring to FIG. 8B. In FIG. 8B, the abscissa denotes the accelerator opening and the ordinate denotes the muscle potential, and it is to be considered that the larger the muscle potential is, the more the muscle is active.

As shown in FIG. 8B, there is not a big difference between the muscle potential of the soleus muscle when the accelerator pedal of the comparative example is pressed down (a fine broken line) and the muscle potential of the soleus muscle when the accelerator pedal 20 of the present invention is pressed down (a fine solid line) in an entire range of the accelerator opening.

Meanwhile, the higher the muscle potential of the gastrocnemius muscle when the accelerator pedal of the comparative example is pressed down (a bold broken line) is, the greater the accelerator opening is. By contrast, the muscle potential of the gastrocnemius muscle when the accelerator pedal 20 of the present invention is pressed down (a bold solid line) not only falls below the muscle potential of the gastrocnemius muscle when the accelerator pedal of the comparative example is pressed down, but becomes constant regardless of the accelerator opening. Further, the muscle potential of the gastrocnemius muscle of the present invention is lower than the muscle potential of the soleus muscle of the present invention over the almost entire range of the accelerator opening.

As described above, the present invention can suppress the move of the gastrocnemius muscle, compared to the comparative example. Further, since the gastrocnemius muscle is the fast muscle when the ankle joint is made to have the plantar flexion, it can be said that the present invention has the reflexive plantar flexion of the ankle joint which is caused by the shift of the right foot's heel, for example, with lower frequency, compared to the comparative example. That is, since the present invention can suppress the move of the fast muscle which tends to get tired easily more than the comparative example when the driver presses down the accelerator pedal, the driver's feeling of fatigue can be reduced properly.

The present pedal structure of the automotive vehicle which attains the above-described move of the muscle can reduce the driver's feeling of fatigue, without damaging the operability of the accelerator pedal 20.

Specifically, since the accelerator pedal body 21 comprises the first pedal pressing face portion 211 including the first pressing face 211a which the passenger's sole contacts and the second pedal pressing face portion 212 including the second pressing face 212a which crosses the first pressing face 211a, the hinge portion 22 of the accelerator pedal 20 can be arranged at the position which is located in back of the imaginary straight line VL which extends downward along the first pressing face 211a of the first pedal pressing face portion 211 in the side view.

Accordingly, even in the case where the driver places the heel in back of the imaginary straight line VL extending downward along the first pressing face 211a of the first pedal pressing face portion 211, the present pedal structure of the automotive vehicle can make the right foot's heel and the hinge portion 22 be closer to each other, compared to the accelerator pedal body having the roughly flat-plate shape.

Moreover, the present pedal structure of the automotive vehicle in which the heel support portion 235 is provided at the pedal base 23 can make the driver easily recognize (determine) the heel position relative to the first pedal pressing face portion 211 when placing the right foot on the first pedal pressing face portion 211 of the accelerator pedal 20. Additionally, the present pedal structure of the automotive vehicle can limit the forward move of the right foot's heel by means of the heel support portion 235.

Thereby, the present pedal structure of the automotive vehicle can suppress the difference (unmatched locus) between the rotational locus Y1 of the first pressing face 211a and the rotational locus Y2 of the right foot when the driver presses down the accelerator pedal 20. Accordingly, the present pedal structure of the automotive vehicle can prevent the moving of the right foot's heel which is caused by the difference in the rotational locus (unmatched locus).

Even in a situation where the right foot is shifted forward when the accelerator pedal 20 is pressed down, the present pedal structure of the automotive vehicle can receive the heel of the right foot at the heel support portion 235, thereby suppressing the difference between the rotational locus Y1 of the first pressing face 211a and the rotational locus Y2 of the right foot.

That is, the present pedal structure of the automotive vehicle can make the driver visually and sensuously recognize (determine) the appropriate position for the operation of the accelerator pedal 20 by means of the heel support portion 235. Accordingly, the present pedal structure of the automotive vehicle can restrain the driver reflexively from making the ankle joint have the plantar flexion or the dorsiflexion. Herein, since the driver's reflexively making the ankle joint have the plantar flexion or the dorsiflexion is performed by the fast muscles, the present pedal structure of the automotive vehicle can suppress the moves of the fast muscles which tend to get tired easily.

Additionally, since the position of the right foot's heel relative to the pressing face portion 211 is stabilized, the driver can operate the accelerator pedal 20 with a properly-light pressing force. Thus, the present pedal structure of the automotive vehicle can reduce the driver's feeling of fatigue, without damaging the operability of the accelerator pedal 20.

Further, since the slant portion 213 configured to slant toward the heel support portion 235 is provided at the second pedal pressing face portion 212 of the accelerator pedal 20, the present pedal structure of the automotive vehicle can stably secure the operability of the accelerator pedal 20 and also securely reduce the driver's feeling of fatigue.

Specifically, when the driver presses down the accelerator pedal 20 in the state where the heel contacts the heel support portion 235, the present pedal structure of the automotive vehicle can prevent the driver's right foot and the second pedal pressing face portion 212 of the accelerator pedal body 21 from contacting each other by means of the slant portion 21 configured to slant toward the heel support portion 235. Accordingly, the present pedal structure of the automotive vehicle can prevent that the pressing operation by the driver's right foot is blocked by the contact of the right foot with the second pedal pressing face portion 212.

Further, since the slant portion 213 slants toward the heel support portion 235, the present pedal structure of the automotive vehicle can make the slant portion 213 serve as a guide means for guiding the right foot's heel which is away from the floor surface toward the heel support portion 235 of the accelerator pedal 20. For example, in a case where the driver returns the right foot after conducting the so-called heel and toe operation, the present pedal structure of the automotive vehicle can stably move the right foot's heel which is away from the floor surface toward the heel support portion 235 along the slant portion 213.

Thus, since the right foot's heel can be stably supported at the heel support portion 235, the present pedal structure of the automotive vehicle can further suppress the difference (unmatched locus) between the rotational locus Y1 of the first pressing face 211a and the rotational locus Y2 of the right foot. Thus, the present pedal structure of the automotive vehicle having the slant portion 213 of the accelerator pedal body 21 can stably secure the operability of the accelerator pedal 20 and also securely reduce the driver's feeling of fatigue.

Moreover, since the heel support portion 235 of the accelerator pedal 20 is formed at the position located closely to the right end of the brake pedal 10 and the accelerator pedal body 21 is configured such that the right foot Z1 which is inclined rightward by about 10 degrees around the heel and the first pressing face 211a of the first pedal pressing face portion 211 contact each other, the present pedal structure of the automotive vehicle can improve the operability of the pressing operation change between the pressing of the brake pedal 10 and the pressing of the accelerator pedal 20 and also reduce the driver's feeling of fatigue securely.

Specifically, since the right end of the brake-pedal pressing face portion 12b and the heel support portion 235 of the accelerator pedal 20 are close to each other in the vehicle width direction, the driver can easily operate the brake pedal 10 and the accelerator pedal 20 alternatively in a state where the heel contacts the heel support portion 235. Thereby, the present pedal structure of the automotive vehicle can achieve a driver's quick pressing change between the brake pedal 10 and the accelerator pedal 20 with the support point at the right foot's heel.

Further, even in a case where the right foot is shifted forward when the driver presses down the brake pedal 10, for example, the present pedal structure of the automotive vehicle can receive the right foot's heel at the heel support portion 235. Accordingly, the present pedal structure of the automotive vehicle can stabilize the position of the right foot for the brake pedal 10 as well as the accelerator pedal 20.

Additionally, when the driver operates the brake pedal 10 and the accelerator pedal 20 alternatively with the support point at the right foot's heel, there often happens a situation where the driver places the right foot on the pressing face of the accelerator pedal 20 in the state where the right foot is inclined rightward by about 10 degrees around the heel.

Herein, by configuring the pedal body of the organ type accelerator pedal such that the right foot of the passenger inclined rightward by about 10 degrees around the heel of the right foot and the first pressing face 211a of the first pedal pressing face portion 211 contact each other, the driver can operate the accelerator pedal 20 securely in a comfortable position.

Herein, since the second pedal pressing face portion 212 is provided to extend rightward relative to the first pressing face portion 211, the present pedal structure of the automotive vehicle can prevent that the second pedal pressing face portion 212 of the accelerator pedal 20 and the right foot of the passenger contact each other.

Thereby, the present pedal structure of the automotive vehicle can compatibly attain the secure operability of the accelerator pedal 20 and the reduction of the driver's feeling of fatigue. Accordingly, the present pedal structure of the automotive vehicle can improve the operability of the brake pedal 10 and the accelerator pedal 20 and reduce the driver's feeling of fatigue more securely.

In corresponding relationships between the present invention and the above-described embodiment, the organ type accelerator pedal of the present invention corresponds to the accelerator pedal 20 of the present embodiment. Likewise, the pivotal portion corresponds to the hinge portion 22, the pressing face which the passenger's sole contacts corresponds to the first facing face 211a, the pressing face portion corresponds to the first pedal pressing face portion 211, the face crossing the pressing face corresponds to the second pressing face 212a, the extension portion corresponds to the second pedal pressing face portion 212, the heel support portion corresponds to the heel support portion 235, and the right foot which is inclined rightward by about 10 degrees around the heel corresponds to the right foot Z1. However, the present invention should not be limited to the above-described embodiment, and any other modifications or improvements may be applied within the scope of a spirit of the present invention.

What is claimed is:

1. A pedal structure of an automotive vehicle, which includes a brake pedal and an organ type accelerator pedal which are provided at a vehicle body side by side in a vehicle width direction and receive a forward pressing operation by a passenger, respectively, the organ type accelerator pedal comprising a pedal body to receive the forward pressing operation by the passenger, a pivotal portion pivotally supporting a lower end of the pedal body, and a pedal base fixed to the vehicle body and supporting the pedal body via the pivotal portion, wherein said pedal body of the organ type accelerator pedal comprises a pressing face portion which includes a pressing face which a sole of the passenger contacts and an extension portion which is configured to extend from a lower end of the pressing face portion rightward and also obliquely rearward and downward and includes a face crossing the pressing face of said pressing face portion, which are integrally formed, and said pedal base of the organ type accelerator pedal comprises a heel support portion having a rear-end face, the heel support portion being positioned on a left side of and adjacently to said pivotal portion and being spaced apart forward from said pivotal portion by a specified distance such that an imaginary line that extends along said pressing face intersects the rear-end face in a view of the pedal structure in the vehicle width direction when the organ type accelerator pedal does not receive the forward pressing operation.

2. The pedal structure of the automotive vehicle of claim 1, wherein said extension portion of the pedal body of the organ type accelerator pedal includes a slant portion at an upper portion thereof, the slant portion being configured to slant toward said heel support portion of the pedal base.

3. The pedal structure of the automotive vehicle of claim 1, wherein said heel support portion of the organ type accelerator pedal is positioned such that a left most end of said heel support portion in the vehicle width direction is positioned alongside a vertical plane extending in forward and rearward directions that is positioned to include a right most end of said brake pedal, and an upper end of said pressing face is positioned further from the plane than a lower end of said pressing face.

4. The pedal structure of the automotive vehicle of claim 2, wherein said heel support portion of the organ type accelerator pedal is positioned such that a left most end of said heel support portion in the vehicle width direction is positioned alongside a vertical plane extending in forward and rearward directions that is positioned to include a right most end of said brake pedal, and an upper end of said pressing face is positioned further from the plane than a lower end of said pressing face.

\* \* \* \* \*